March 15, 1960     A. T. FLOWER     2,928,636
SPREADER FOR CONDUCTOR WIRES
Filed April 15, 1957     2 Sheets-Sheet 1
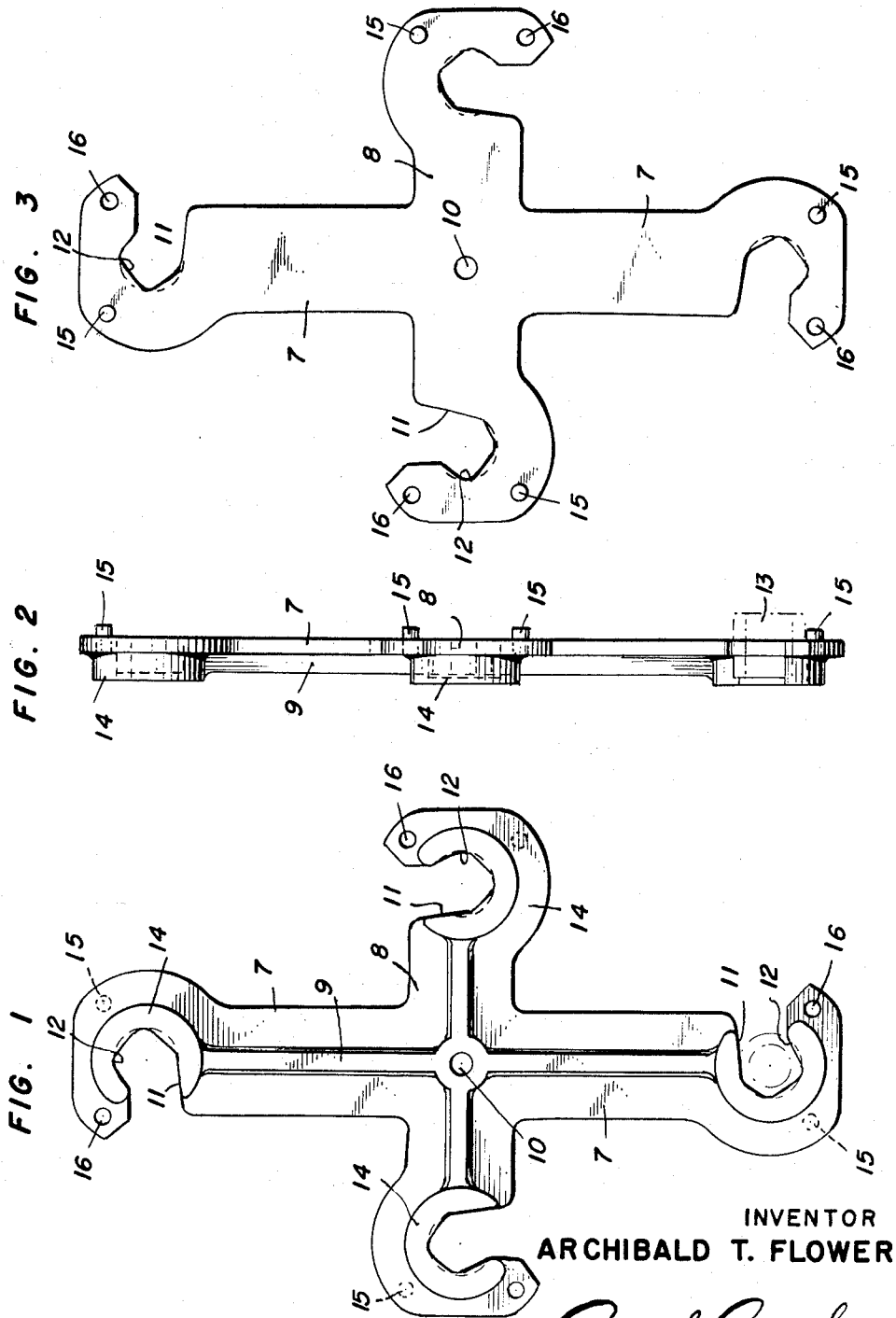
INVENTOR
ARCHIBALD T. FLOWER
BY *G. Ralph Burch*
ATTORNEY March 15, 1960  A. T. FLOWER  2,928,636
SPREADER FOR CONDUCTOR WIRES
Filed April 15, 1957  2 Sheets-Sheet 2

INVENTOR
ARCHIBALD T. FLOWER
BY *Ralph B Burch*
ATTORNEY

United States Patent Office 2,928,636
Patented Mar. 15, 1960

2,928,636

SPREADER FOR CONDUCTOR WIRES

Archibald Thomas Flower, Glenside, Pa.

Application April 15, 1957, Serial No. 652,836

3 Claims. (Cl. 248—61)

This invention relates to improvements in spreaders for electric conductor wires.

It is an object of the invention to provide a spreader which will provide greater clearance between the conductors thus increasing the length of the insulation path to reduce flashovers and failure between phases and grounded messenger.

A further object of the invention resides in providing a spreader composed of like cross-shaped members pivotally connected together to permit rotation of the members to move the arms of the members into and out of parallel relation, the outer ends of the arms being provided with slots to receive the conductors.

A still further object of the invention resides in providing a pair of cross-shaped members pivotally connected together, the arms of the members having interfitting means for locking the arms in parallel relation to prevent accidental separation of the arms when engaged with the conductors.

Other objects and advantages of the invention will be apparent during the course of the following description.

In the accompanying drawings forming a part of this specification and in which like numerals are employed to designate like parts throughout the same, Fig. 1 is a front elevational view of one of the members forming the spreader, Fig. 2 is an edge view of the same, Fig. 3 is a rear elevational view of the same, Fig. 4 is an elevational view of the members assembled.

Figure 4:
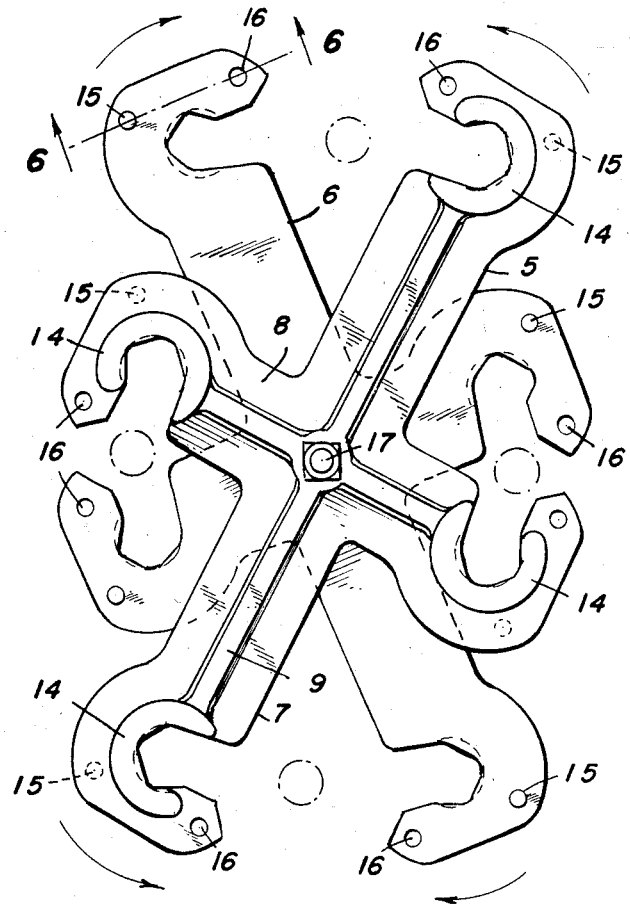
Figure 5:
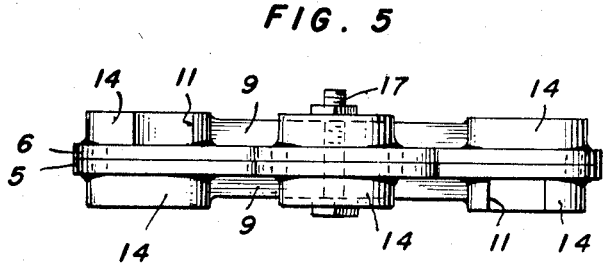
Fig. 5 is an edge view of the assembled members.
Figure 6:
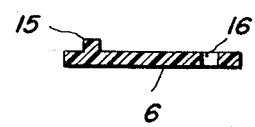
Fig. 6 is a section taken on line 6—6 of Fig. 4.

Referring to the drawings, the numerals 5 and 6 designate a pair of cross-shaped members, of identical construction, joined together for pivotal movement. The members 5 and 6 are made of methyl methacrylate plastic material which has a high arc resisting characteristic but may be made of other suitable insulating material. Each member consists of a straight bar and a cross bar intermediate its ends providing a series of radiating arms 7 and 8, with the arms 7 being of greater length than the arms 8. The outer face of each member is provided with a raised rib 9 along the medial line of the straight and cross bars and at the intersecting point of the ribs is a central opening 10 extending through the bar. The outer ends of the arms 7 and 8 are slightly enlarged and opening through one side edge of the arms are inwardly extending slots 11 which are circular shape at their inner ends and notched, as at 12, for reception and retention of the conductor wires. A split neoprene bushing 13 may be inserted in the slots 11, if desired, and surrounding the marginal edge of the slots are raised flanges 14. The inner face of the members is smooth but at the outer ends of the arms 7 and 8 are provided projecting pins 15 to one side of the medial line and openings 16 on the opposite side of the medial line. The pins at opposite ends of the arms are on alternate sides of the medial line to permit entry of the pins into the mating holes when the members are placed back to back.

The pair of members 5 and 6, which are alike are disposed with the inner faces in confronting relation and are pivotally connected together by a pivot bolt 17 extending through the central openings 10 of the members. With the members rotated to the position shown in Fig. 4, the slots in the arms of one member will have their open ends facing the open ends of the slots of the other member so that the conductor wires may be inserted in the slots of the arms of either of the members. The pivot bolt 17 is adjustable so the members 5 and 6 may be spaced apart a sufficient distance to allow free pivotal movement of one member with respect to the other while inserting the conductors in the slots. After the conductors are disposed in the slots the members are rotated to bring the arms of the members into parallel relation with the pins 15 of the arms of each member in registering relation to the openings 16. Upon seating of the pins 15 in the openings 16, the pivot bolt 17 is tightened thus holding the members in interlocked engagement to prevent accidental rotation of the members.

Thus, it will be seen that when the conductors are disposed in the slots of arms 7 and 8 the angular relation of the arms provides open spaces between the conductors so there is no direct insulation path between the conductors which affords greater protection against tracking and electrical leakage. The spreader may be applied to the conductors with the longer arms either in a vertical or horizontal plane and the messenger may be disposed in the slot of any of the arms.

The present invention is an improvement in the spreader bar disclosed in applicant's prior application filed March 26, 1954, now Patent No. 2,825,751.

Having thus described my invention, I claim:

1. A spreader bar for aerial electric cables including a supporting messenger and set of conductor wires comprising a pair of alike members in face to face relation, each member having a plurality of radiating arms in angular relation to each other providing open spaces between the arms throughout their length, means in the center of said members pivotally connecting the members for rotation with respect to each other, the arms of said members having slots in their outer ends at an angle to the longitudinal axis of the arms and opening through a longitudinal edge of the arms, the open ends of the slots of the arms of one member opening in a direction opposite to that of the open ends of the slots of the arms of the other member with the open ends in facing relation upon rotation of said members for inserting the messenger and conductor wires in the slots of the arms of one of the said members, said wires being received in the slots of the arms of the other member upon rotation of said members to swing the arms into superimposed relation.

2. A spreader bar for aerial electric cables as described in claim 1 wherein the arms of said members are of different length with the arms of the same length in confronting relation.

3. A spreader bar for aerial electric cables as described in claim 1 including pins projecting from the confronting faces of the arms of said members adapted to seat in recesses in the arms when the arms are in superimposed relation.

References Cited in the file of this patent

UNITED STATES PATENTS

| | | |
|---|---|---|
| 443,622 | Amos | Dec. 30, 1890 |
| 512,722 | Landis | Jan. 16, 1894 |
| 2,783,296 | Hendrix | Feb. 26, 1957 |
| 2,820,083 | Hendrix | Jan. 14, 1958 |
| 2,825,751 | Flower | Mar. 4, 1958 |
| 2,860,907 | Vanciel | Nov. 18, 1958 |